(12) United States Patent
Roberts et al.

(10) Patent No.: US 8,821,145 B2
(45) Date of Patent: Sep. 2, 2014

(54) DIE FOR COEXTRUDING A PLURALITY OF FLUID LAYERS

(71) Applicant: Cryovac, Inc., Duncan, SC (US)

(72) Inventors: Lawrence E Roberts, Spartanburg, SC (US); Anton L Timmons, Mauldin, SC (US); Bradford E Webster, Moore, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 13/765,954

(22) Filed: Feb. 13, 2013

(65) Prior Publication Data

US 2013/0149403 A1 Jun. 13, 2013

Related U.S. Application Data

(63) Continuation of application No. 12/284,510, filed on Sep. 23, 2008, now abandoned.

(51) Int. Cl.
| | |
|---|---|
| *B29C 47/06* | (2006.01) |
| *B29D 23/00* | (2006.01) |
| *B29C 47/00* | (2006.01) |
| *B29C 47/20* | (2006.01) |
| *B29C 47/12* | (2006.01) |
| *B29C 47/14* | (2006.01) |
| *B29C 47/26* | (2006.01) |
| B29K 23/00 | (2006.01) |
| B29K 77/00 | (2006.01) |
| B29K 69/00 | (2006.01) |
| *B29C 47/56* | (2006.01) |
| B29K 25/00 | (2006.01) |
| B29K 67/00 | (2006.01) |

(52) U.S. Cl.
CPC ......... *B29D 23/00* (2013.01); *B29K 2023/0625* (2013.01); *B29K 2077/00* (2013.01); *B29C 2791/007* (2013.01); *B29C 47/0026* (2013.01); *B29K 2023/0616* (2013.01); *B29C 47/20* (2013.01); *B29K 2023/0633* (2013.01); *B29C 47/128* (2013.01); *B29K 2069/00* (2013.01); *B29K 2023/0608* (2013.01); *B29C 47/0059* (2013.01); *B29C 47/145* (2013.01); *B29C 47/0023* (2013.01); *B29K 2023/06* (2013.01); *B29C 47/56* (2013.01); *B29K 2023/086* (2013.01); *B29C 47/061* (2013.01); *B29K 2023/12* (2013.01); *B29C 47/065* (2013.01); *B29K 2023/065* (2013.01); *B29C 47/263* (2013.01); *B29C 47/009* (2013.01); *B29K 2023/0641* (2013.01); *B29K 2025/00* (2013.01); *B29K 2023/083* (2013.01); *B29C 47/0057* (2013.01); *B29C 47/0021* (2013.01); *B29C 47/06* (2013.01); *B29K 2067/00* (2013.01)
USPC .................................. 425/131.1; 264/173.16

(58) Field of Classification Search
None
See application file for complete search history.

(56) References Cited

U.S. PATENT DOCUMENTS

| | | |
|---|---|---|
| 3,557,265 A | 1/1971 | Chisholm et al. |
| 3,565,985 A | 2/1971 | Schrenk et al. |

(Continued)

FOREIGN PATENT DOCUMENTS

WO 0076765 12/2000

OTHER PUBLICATIONS

Office Action from U.S. Appl. No. 12/284,510 dated Jun. 2, 2009.

(Continued)

*Primary Examiner* — Benjamin Schiffman
(74) *Attorney, Agent, or Firm* — Thomas C. Lagaly

(57) ABSTRACT

A die for coextruding a plurality of fluid layers generally includes a primary forming stem, one or more distribution plates, and a microlayer assembly. The microlayer assembly includes a microlayer forming stem and a plurality of microlayer distribution plates.

19 Claims, 4 Drawing Sheets

(56) References Cited

U.S. PATENT DOCUMENTS

| | | |
|---|---|---|
| 3,576,707 A | 4/1971 | Schrenk et al. |
| 3,716,612 A | 2/1973 | Schrenk et al. |
| 3,759,647 A | 9/1973 | Schrenk et al. |
| 3,773,882 A | 11/1973 | Schrenk |
| 3,801,429 A | 4/1974 | Schrenk et al. |
| 3,860,372 A | 1/1975 | Newman, Jr. |
| 3,884,606 A | 5/1975 | Schrenk |
| 4,047,868 A | 9/1977 | Kudo et al. |
| 4,426,344 A | 1/1984 | Dinter et al. |
| 4,472,129 A | 9/1984 | Siard |
| 4,496,413 A | 1/1985 | Sharps, Jr. |
| 4,522,775 A | 6/1985 | Briggs et al. |
| 4,578,025 A | 3/1986 | Ando et al. |
| 4,657,497 A | 4/1987 | Dehennau et al. |
| 4,770,837 A | 9/1988 | Lu et al. |
| 4,784,594 A | 11/1988 | Sharps, Jr. |
| 4,798,526 A | 1/1989 | Briggs et al. |
| 4,832,589 A | 5/1989 | Gini et al. |
| 4,895,744 A | 1/1990 | Briggs et al. |
| 4,937,035 A | 6/1990 | Richter |
| 5,019,433 A | 5/1991 | Briggs et al. |
| 5,046,938 A | 9/1991 | Hirschberger |
| 5,069,612 A | 12/1991 | Teutsch et al. |
| 5,076,776 A | 12/1991 | Yamada et al. |
| 5,094,788 A | 3/1992 | Schrenk et al. |
| 5,094,793 A | 3/1992 | Schrenk et al. |
| 5,269,995 A | 12/1993 | Ramanathan et al. |
| 5,393,216 A | 2/1995 | Teutsch et al. |
| 5,674,440 A | 10/1997 | Klinedinst |
| 5,716,650 A | 2/1998 | Mavridis |
| 5,762,971 A | 6/1998 | Schirmer |
| 5,779,959 A | 7/1998 | Teutsch et al. |
| 5,840,232 A | 11/1998 | La Belle |
| 6,000,926 A | 12/1999 | Schirmer |
| 6,071,450 A | 6/2000 | Topolkaraey et al. |
| 6,082,025 A | 7/2000 | Bonk et al. |
| 6,190,152 B1 | 2/2001 | Cree |
| 6,305,922 B1 | 10/2001 | Gates |
| 6,409,953 B1 | 6/2002 | Planeta et al. |
| 6,413,595 B1 | 7/2002 | Schirmer |
| 6,471,502 B2 | 10/2002 | Cree |
| 6,638,461 B2 | 10/2003 | Davidson et al. |
| 6,638,462 B2 | 10/2003 | Davidson et al. |
| 6,638,463 B2 | 10/2003 | Davidson et al. |
| 6,638,464 B2 | 10/2003 | Davidson et al. |
| 6,837,698 B2 | 1/2005 | Floyd et al. |
| 6,905,324 B2 | 6/2005 | Cloeren |
| 6,926,858 B2 | 8/2005 | Cree |
| 6,936,203 B2 | 8/2005 | Reilly et al. |
| 6,951,675 B2 | 10/2005 | Chin et al. |
| 7,097,441 B2 | 8/2006 | Sagar et al. |
| 7,105,117 B2 | 9/2006 | Rodgers et al. |
| 7,150,848 B2 | 12/2006 | Cree |
| 7,166,099 B2 | 1/2007 | Devens, Jr. |
| 2002/0165523 A1 | 11/2002 | Chin et al. |
| 2003/0201565 A1 | 10/2003 | Cloeren |
| 2004/0070105 A1 | 4/2004 | Rasmussen |
| 2005/0003035 A1 | 1/2005 | Zucker et al. |
| 2005/0029691 A1 | 2/2005 | Cloeren |
| 2005/0191378 A1 | 9/2005 | Brenyer |
| 2006/0055076 A1 | 3/2006 | Cloeren |
| 2007/0141194 A1 | 6/2007 | Rubbelke |
| 2007/0187856 A1 | 8/2007 | Kitauji et al. |
| 2010/0173031 A1 | 7/2010 | Roberts et al. |

OTHER PUBLICATIONS

Amendment from U.S. Appl. No. 12/284,510 dated Nov. 2, 2009.
Office Action from U.S. Appl. No. 12/284,510 dated Mar. 1, 2010.
Appeal Brief from U.S. Appl. No. 12/284,510 dated Aug. 2, 2010.
Examiner's Answer from U.S. Appl. No. 12/284,510 dated Oct. 26, 2010.
Reply Brief from U.S. Appl. No. 12/284,510 dated Nov. 16, 2010.
Office Action from U.S. Appl. No. 12/284,510 dated Sep. 24, 2012.
Request for Rehearing from U.S. Appl. No. 12/284,510 dated Nov. 16, 2012,.
Decision on Request for Rehearing from U.S. Appl. No. 12/284,510 dated Dec. 20, 2012.
Office Action from U.S. Appl. No. 12/661,341 dated Sep. 21, 2012.
Amendment from U.S. Appl. No. 12/661,341 dated Dec. 13, 2012.
Office Action from U.S. Appl. No. 12/661,341 dated Feb. 21, 2013.
Amendment from U.S. Appl. No. 12/661,341 dated May 20, 2013.
Declaration from U.S. Appl. No. 12/661,341 dated May 20, 2013.
Office Action from U.S. Appl. No. 12/661,341 dated Feb. 19, 2014.
Office Action from U.S. Appl. No. 13/754,012 dated Nov. 22, 2013.

DIE FOR COEXTRUDING A PLURALITY OF FLUID LAYERS

This application is a continuation of U.S. patent application Ser. No. 12/284,510, filed Sep. 23, 2008, the disclosure of which is hereby incorporated herein by reference thereto.

BACKGROUND OF THE INVENTION

The present invention relates to a coextrusion die and, more particularly, to a coextrusion die containing both a microlayer assembly and one or more distribution plates to produce coextruded films having both microlayers and thicker, conventional film layers.

Coextrusion is a technique for producing a multilayer plastic (polymeric) film by bringing two or more molten polymers together in a die, in which the polymers are formed into a generally tubular or planar shape, juxtaposed in layered form, and then pushed out of an annular- or slot-shaped opening in the die. Once outside of the die, the still-molten multilayer film is exposed to an environment having a temperature that is maintained below the melting point of the component polymeric layers of the film, which causes the layers to melt-bond together as they cool and solidify.

Multilayer films typically have a thickness in the range of 50-200 mils upon emergence from the die, but the films are generally stretched prior to final solidification in order to expand their surface area and reduce their final thickness to a range of about 0.5 to about 50 mils. Conventional multilayer films generally have 3-10 layers; prior to stretching and thinning, i.e., while still in the die, each such layer generally ranges from about 20-100 mils in thickness.

Microlayer extrusion is a technique for increasing the total number of layers in a multilayer film for a given film thickness, by reducing the thickness of the component layers of the film. Thus, while conventional film layers generally range from 20-100 mils inside the die (i.e., prior to stretching and thinning), microlayers generally have an 'in-die' thickness ranging from about 1-20 mils. In this manner, microlayered films may have far more than 10 layers, e.g., 20, 30, 40, 50, or more layers. Such microlayered films have been found to provide certain beneficial properties relative to conventional films composed of thicker layers that are fewer in number, e.g., improved mechanical properties such as superior flex cracking and puncture resistance.

For many applications, it is desirable to combine thicker, conventional layers with microlayers. Such thicker layers are often superior to microlayers for functions such as heat-sealing and abuse-resistance.

Unfortunately, it has proven to be difficult to combine the flow of thin layers, such as microlayers, with relatively thick layers in such a way that the physical integrity and independent properties of the thin layers are maintained. This is primarily the result of interfacial flow instabilities, which are encountered when microlayers are merged together with thicker layers in a die. Such interfacial flow instabilities are caused by the more powerful sheer forces of the thicker layers flowing against the microlayers, which result from the higher mass flow rate of the thicker layers relative to the microlayers. The resultant loss of the integrity and independent characteristics of the microlayers diminishes or even eradicates the beneficial properties thereof.

Accordingly, there is a need in the art for an improved die that permits microlayers to be combined with conventional, thicker layers in such a way that the integrity and independent properties of the microlayers are maintained.

SUMMARY OF THE INVENTION

That need is met by the present invention, which, in one aspect, provides a die for coextruding a plurality of fluid layers, comprising;
  a. a primary forming stem;
  b. one or more distribution plates, each of the plates having a fluid inlet and a fluid outlet, the fluid outlet from each of the plates being in fluid communication with the primary forming stem and structured to deposit a layer of fluid onto the primary forming stem; and
  c. a microlayer assembly, comprising
    (1) a microlayer forming stem, and
    (2) a plurality of microlayer distribution plates, each of the microlayer plates having a fluid inlet and a fluid outlet, the fluid outlet from each of the microlayer plates being in fluid communication with the microlayer forming stem and structured to deposit a microlayer of fluid onto the microlayer forming stem, the microlayer plates being arranged to provide a predetermined order in which the microlayers are deposited onto the microlayer forming stem to form a substantially unified, microlayered fluid mass on the microlayer forming stem,
  wherein, the microlayer forming stem is in fluid communication with the primary forming stem such that the microlayered fluid mass flows from the microlayer forming stem and onto the primary forming stem.

Another aspect of the invention is directed to a system for coextruding a plurality of fluid layers, comprising a die as described above, and one or more extruders in fluid communication with the die to supply one or more fluids to the die.

A further aspect of the invention pertains to a method of coextruding a plurality of fluid layers, comprising:
  a. directing a fluid through a distribution plate and onto a primary forming stem, the distribution plate having a fluid inlet and a fluid outlet, the fluid outlet from the plate being in fluid communication with the primary forming stem and structured such that the fluid is deposited onto the primary forming stem as a layer;
  b. forming a substantially unified, microlayered fluid mass on a microlayer forming stem by directing at least one additional fluid through a microlayer assembly, the microlayer assembly comprising a plurality of microlayer distribution plates, each of the microlayer plates having a fluid inlet and a fluid outlet, the fluid outlet from each of the microlayer plates being in fluid communication with the microlayer forming stem and structured to deposit a microlayer of fluid onto the microlayer forming stem, the microlayer plates being arranged to provide a predetermined order in which the microlayers are deposited onto the microlayer forming stem; and
  c. directing the microlayered fluid mass from the microlayer forming stem and onto the primary forming stem to merge the microlayered fluid mass with the fluid layer from the distribution plate.

These and other aspects and features of the invention may be better understood with reference to the following description and accompanying drawings.

DETAILED DESCRIPTION OF THE INVENTION

Figure 1:
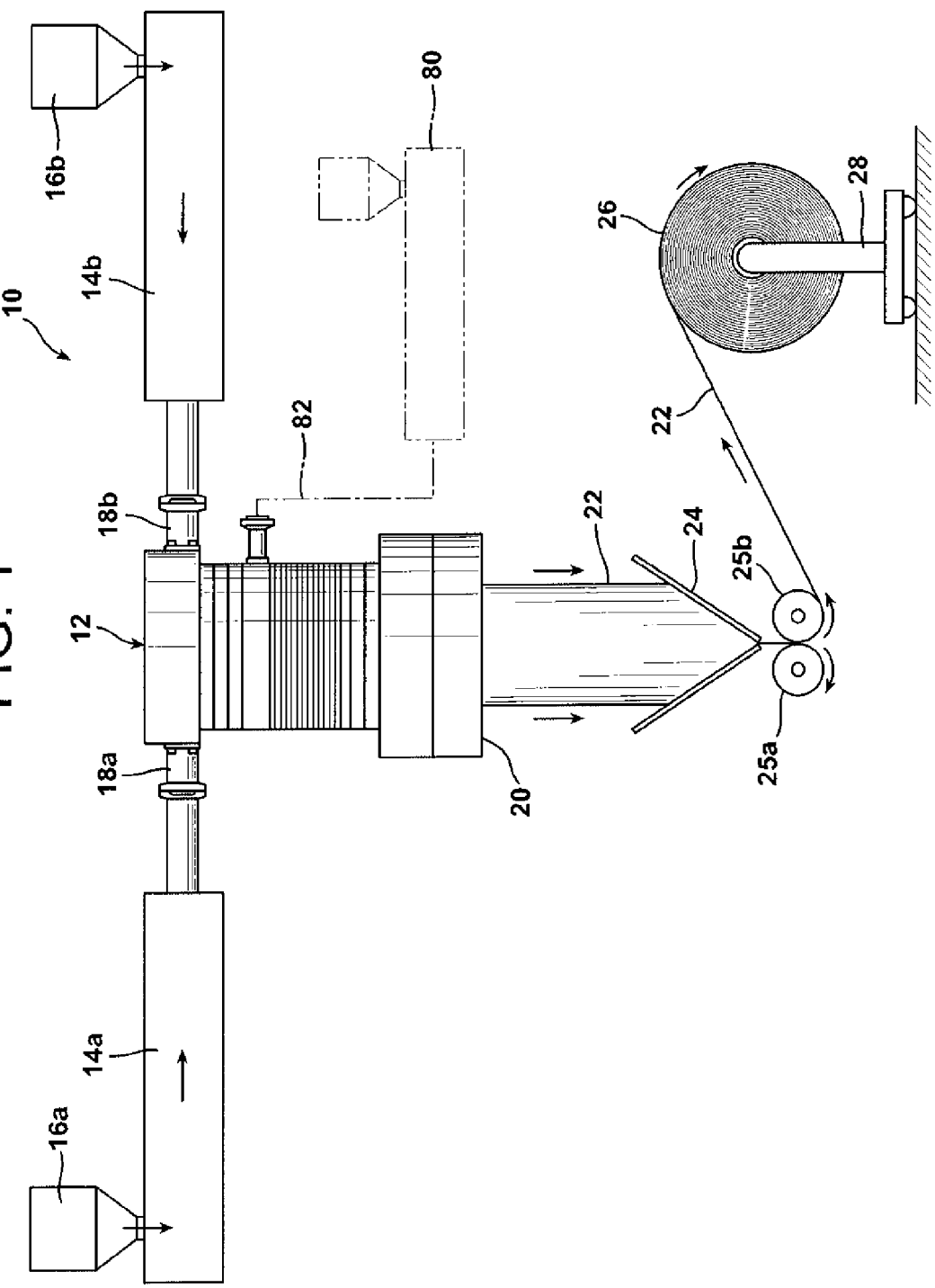
FIG. 1 is a schematic view of a system 10 in accordance with the present invention for coextruding a plurality of fluid layers, including a die 12.

FIG. 1 schematically illustrates a system 10 in accordance with the present invention for coextruding a plurality of fluid layers. System 10 generally includes a die 12 and one or more extruders 14a and 14b in fluid communication with the die 12 to supply one or more fluids to the die.

In a typical application, the fluid layers coextruded by die 12 may comprise one or more molten thermoplastic polymers. Examples of such polymers include polyolefins, polyesters (e.g., PET), polystyrenes, polyamide homopolymers and copolymers (e.g. PA6, PA12, PA6/12, etc.), polycarbonates, etc. Within the family of polyolefins, various polyethylene homopolymers and copolymers may be used, as well as polypropylene homopolymers and copolymers (e.g., propylene/ethylene copolymer). Polyethylene homopolymers may include low density polyethylene (LDPE) and high density polyethylene (HDPE). Suitable polyethylene copolymers may include a wide variety of polymers, such as, e.g., ionomers, ethylene/vinyl acetate (EVA), ethylene/vinyl alcohol (EVOH), and ethylene/alpha-olefins, including heterogeneous (Zeigler-Natta catalyzed) and homogeneous (metallocene, single-cite catalyzed) ethylene/alpha-olefin copolymers. Ethylene/alpha-olefin copolymers are copolymers of ethylene with one or more comonomers selected from $C_3$ to $C_{20}$ alpha-olefins, such as 1-butene, 1-pentene, 1-hexene, 1-octene, methyl pentene and the like, including linear low density polyethylene (LLDPE), linear medium density polyethylene (LMDPE), very low density polyethylene (VLDPE), and ultra-low density polyethylene (ULDPE).

As is conventional, the polymeric materials may be supplied to the extruders 14a, b in the solid-state, e.g., in the form of pellets or flakes, via respective hoppers 16a, b. Extruders 14a, b are maintained at a temperature sufficient to convert the solid-state polymer to a molten state, and internal screws within the extruders (not shown) move the molten polymer into and through die 12 via respective pipes 18a, b. As will be explained in further detail below, within die 12, the molten polymer is converted into thin film layers, and each of the layers are superimposed, combined together, and expelled from the die at discharge end 20, i.e., "coextruded," to form a tubular, multilayer film 22. Upon emergence from the die 12 at discharge end 20, the tubular, multilayer film 22 is exposed to ambient air or a similar environment having a temperature sufficiently low to cause the molten polymer from which the film is formed to transition from a liquid state to a solid state. Additional cooling/quenching of the film may be achieved by providing a liquid quench bath (not shown), and then directing the film through such bath.

The solidified tubular film 22 is then collapsed by a convergence device 24, e.g., a V-shaped guide as shown, which may contain an array of rollers to facilitate the passage of film 22 therethrough. A pair of counter-rotating drive rollers 25a, b may be employed as shown to pull the film 22 through the convergence device 24. The resultant collapsed tubular film 22 may then be wound into a roll 26 by a film winding device 28 as shown. The film 22 on roll 26 may subsequently be unwound for use, e.g., for packaging, or for further processing, e.g., stretch-orientation, irradiation, or other conventional film-processing techniques, which are used to impart desired properties as necessary for the intended end-use applications for the film.

Figure 2:
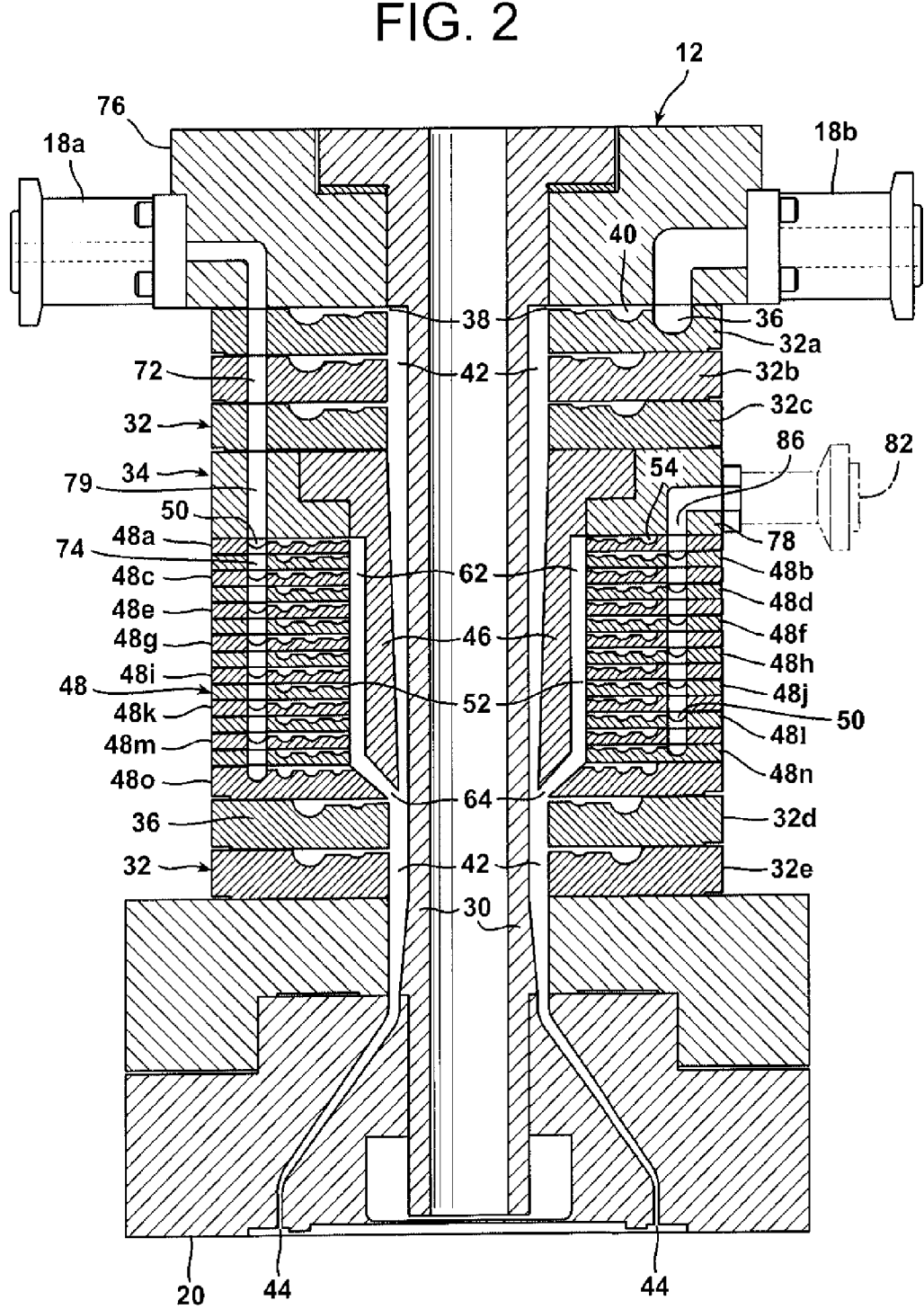
FIG. 2 is a cross-sectional view of the die 12 shown in FIG. 1.

Referring now to FIG. 2, die 12 will be described in further detail. As noted above, die 12 is adapted to coextrude a plurality of fluid layers, and generally includes a primary forming stem 30, one or more distribution plates 32, and a microlayer assembly 34. In the presently illustrated die, five distribution plates 32 are included, as individually indicated by the reference numerals 32a-e. A greater or lesser number of distribution plates 32 may be included as desired. The number of distribution plates in die 12 may range, e.g., from one to twenty, or even more then twenty if desired.

Each of the distribution plates 32 has a fluid inlet 36 and a fluid outlet 38 (the fluid inlet is not shown in plate 32b). The fluid outlet 38 from each of the distribution plates 32 is in fluid communication with the primary forming stem 30, and also is structured to deposit a layer of fluid onto the primary forming stem. The distribution plates 32 may be constructed as described in U.S. Pat. No. 5,076,776, the entire disclosure of which is hereby incorporated herein by reference thereto. As described in the '776 patent, the distribution plates 32 may have one or more spiral-shaped fluid-flow channels 40 to direct fluid from the fluid inlet 36 and onto the primary forming stem 30 via the fluid outlet 38. As the fluid proceeds along the channel 40, the channel becomes progressively shallower such that the fluid is forced to assume a progressively thinner profile. The fluid outlet 38 generally provides a relatively narrow fluid-flow passage such that the fluid flowing out of the plate has a final desired thickness corresponding to the thickness of the fluid outlet 38. Other channel configurations may also be employed, e.g., a toroid-shaped channel; an asymmetrical toroid, e.g., as disclosed in U.S. Pat. No. 4,832,589; a heart-shaped channel; a helical-shaped channel, e.g., on a conical-shaped plate as disclosed in U.S. Pat. No. 6,409,953, etc. The channel(s) may have a semi-circular or semi-oval cross-section as shown, or may have a fuller shape, such as an oval or circular cross-sectional shape.

In some embodiments, distribution plates 32 may have a generally annular shape such that the fluid outlet 38 forms a generally ring-like structure, which forces fluid flowing through the plate to assume a ring-like form. Such ring-like structure of fluid outlet 38, in combination with its proximity to the primary forming stem 30, causes the fluid flowing through the plate 32 to assume a cylindrical shape as the fluid is deposited onto the stem 30. Each flow of fluid from each of the distribution plates 32 thus forms a distinct cylindrical layer on the primary forming stem 30.

The fluid outlets 38 of the distribution plates 32 are spaced from the primary forming stem 30 to form an annular passage 42. The extent of such spacing is sufficient to accommodate the volume of the concentric fluid layers flowing along the forming stem 30.

The order in which the distribution plates 32 are arranged in die 12 determines the order in which the fluid layers are deposited onto the primary forming stem 30. For example, if all five distribution plates 32a-e are supplied with fluid, fluid from plate 32a will be the first to be deposited onto primary forming stem 30 such that such fluid will be in direct contact with the stem 30. The next layer to be deposited onto the forming stem would be from distribution plate 32b. This layer will be deposited onto the fluid layer from plate 32a. Next, fluid from plate 32c will be deposited on top of the fluid from plate 32b. If microlayer assembly 34 were not present in the die, the next layer to be deposited would be from distribution plate 32d, which would be layered on top of the fluid layer from plate 32c. Finally, the last and, therefore, outermost layer to be deposited would be from plate 32e. In this example (again, ignoring the microlayer assembly 34), the resultant tubular film 22 that would emerge from the die would have five distinct layers, which would be arranged as five concentric cylinders bonded together.

Accordingly, it may be appreciated that the fluid layers from the distribution plates 32 are deposited onto the primary forming stem 30 either directly (first layer to be deposited, e.g., from distribution plate 32a) or indirectly (second and subsequent layers, e.g., from plates 32b-e).

As noted above, the tubular, multilayer film 22 emerges from die 12 at discharge end 20. The discharge end 20 may thus include an annular discharge opening 44 to allow the passage of the tubular film 22 out of the die. Such annular discharge opening is commonly referred to as a "die lip." As illustrated, the diameter of the annular discharge opening 44 may be greater than that of the annular passage 42, e.g., to increase the diameter of the tubular film 22 to a desired extent. This has the effect of decreasing the thickness of each of the concentric layers that make up the tubular film 22, i.e., relative to the thickness of such layers during their residence time within the annular passage 42. Alternatively, the diameter of the annular discharge opening 44 may be smaller than that of the annular passage 42.

Microlayer assembly 34 generally comprises a microlayer forming stem 46 and a plurality of microlayer distribution plates 48. In the presently illustrated embodiment, fifteen microlayer distribution plates 48a-o are shown. A greater or lesser number of microlayer distribution plates 48 may be included as desired. The number of microlayer distribution plates 48 in microlayer assembly 34 may range, e.g., from one to fifty, or even more then fifty if desired. In many embodiments of the present invention, the number of microlayer distribution plates 48 in microlayer assembly 34 will be at least about 5, e.g., 10, 15, 20, 25, 30, 35, 40, 45, 50, etc., or any number of plates in between the foregoing numbers.

Each of the microlayer plates 48 has a fluid inlet 50 and a fluid outlet 52. The fluid outlet 52 from each of the microlayer plates 48 is in fluid communication with microlayer forming stem 46, and is structured to deposit a microlayer of fluid onto the microlayer forming stem. Similar to the distribution plates 32, the microlayer plates 48 may also be constructed as described in the above-incorporated U.S. Pat. No. 5,076,776.

Figure 3:
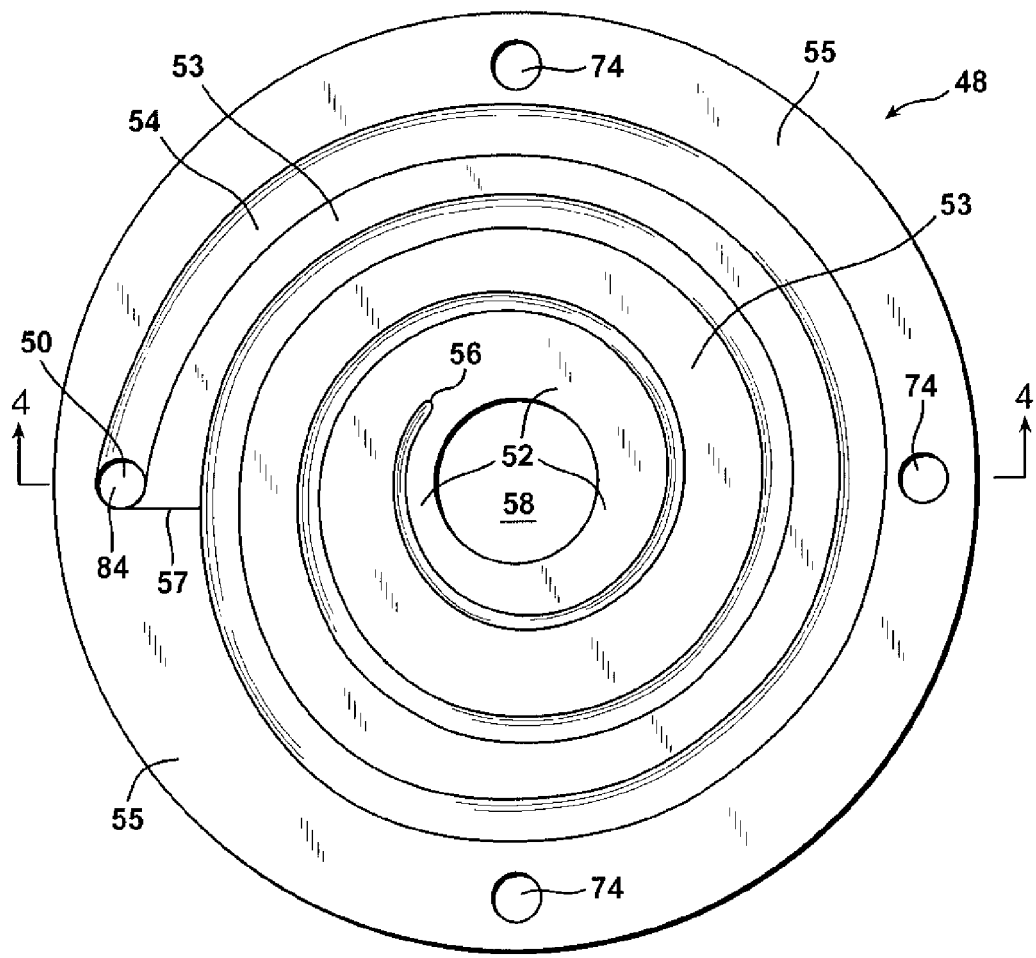
FIG. 3 is a plan view one of the microlayer plates 48 in die 12.

For example, as shown in FIG. 3, the microlayer plates 48 may have a spiral-shaped fluid-flow channel 54, which is supplied with fluid via fluid inlet 50. Alternatively, two more fluid-flow channels may be employed in plate 48, which may be fed from separate fluid inlets or a single fluid inlet. Other channel configurations may also be employed, e.g., a toroid-shaped channel; an asymmetrical toroid, e.g., as disclosed in U.S. Pat. No. 4,832,589; a heart-shaped channel; a helical-shaped channel, e.g., on a conical-shaped plate as disclosed in U.S. Pat. No. 6,409,953; etc. The channel(s) may have a semi-circular or semi-oval cross-section as shown, or may have a fuller shape, such as an oval or circular cross-sectional shape.

Figure 4:
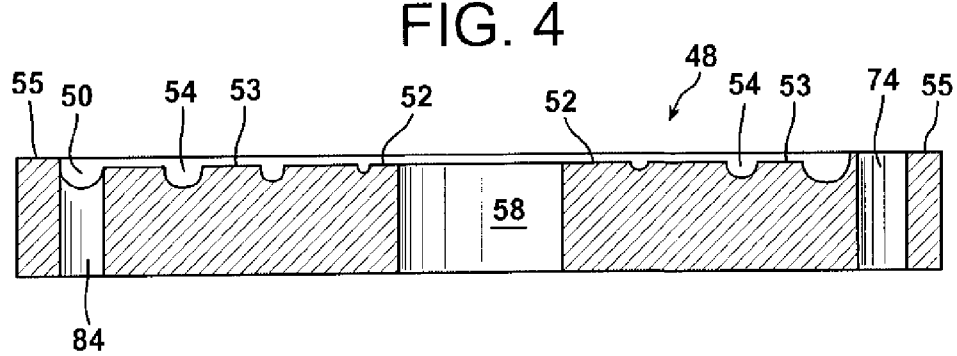
FIG. 4 is a cross-sectional view of the microlayer plate 48 shown in FIG. 3.
Figure 5:
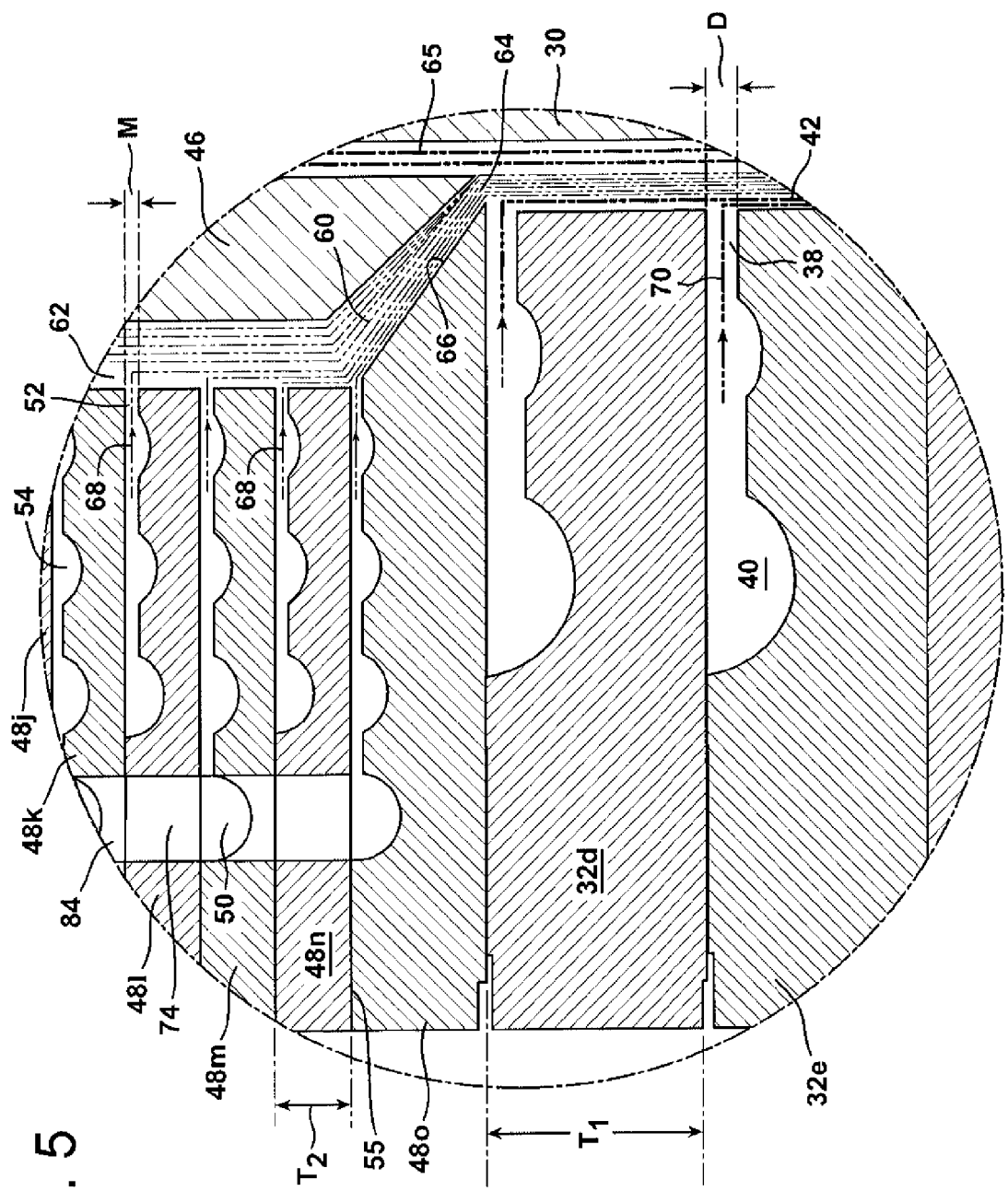
FIG. 5 is a magnified, cross-sectional view of die 12, showing the combined flows from the microlayer plates 48 and distribution plates 32.

Regardless of the particular configuration or pattern that is selected for the flow channel(s) 54, its function is to connect the fluid inlet(s) 50 with the fluid outlet 52 in such a manner that the flow of fluid through the microlayer assembly 34 is converted from a generally stream-like, axial flow to a generally film-like, convergent radial flow towards the microlayer forming stem 46. Microlayer plate 48 as shown in FIG. 3 may accomplish this in two ways. First, the channel 54 spirals inwards towards the center of the plate, and thus directs fluid from the fluid inlet 50, located near the periphery of the plate, towards the fluid outlet 52, which is located near the center of the plate. Secondly, the channel 54 may be fashioned with a progressively shallower depth as the channel approaches the fluid outlet 52. This has the effect of causing some of the fluid flowing through the channel 54 to overflow the channel and proceed radially-inward toward the fluid outlet 52 in a relatively flat, film-like flow. Such radial-inward flow may occur in overflow regions 53, which may be located between the spaced-apart spiral sections of channel 54. As shown in FIG. 4, the overflow regions 53 may be formed as recessed sections in plate 48, i.e., recessed relative to the thicker, non-recessed region 55 at the periphery of the plate. As shown in FIG. 3, overflow regions 53 may begin at step-down 57 and, e.g., spiral inwards towards fluid outlet 52 between the spirals of channel 54. The non-recessed, peripheral region 55 abuts against the plate or other structure above the plate, e.g., as shown in FIGS. 2 and 5, and thus prevents fluid from flowing outside the periphery of the plate. In this manner, the non-recessed, peripheral region 55 forces fluid entering the plate to flow radially inward toward fluid outlet 52. Step-down 57 thus represents a line or zone of demarcation between the 'no-flow' peripheral region 55 and the 'flow' regions 53 and 54. The fluid that remains in the channel 54 and reaches the end 56 of the channel flows directly into the fluid outlet 52.

The fluid outlet 52 generally provides a relatively narrow fluid-flow passage and generally determines the thickness of the microlayer flowing out of the microlayer plate 48. The thickness of the fluid outlet 52, and therefore the thickness of the microlayer flowing therethrough, may be determined, e.g., by the spacing between the plate surface at outlet 52 and the bottom of the plate or other structure (e.g., manifold 76 or 78) immediately above the plate surface at outlet 52.

With continuing reference to FIGS. 2-3, each of the microlayer distribution plates 48 may have an orifice 58 extending through the plate. The orifice 58 may be located substantially in the center of each microlayer plate 48, with the fluid outlet 52 of each plate positioned adjacent to such orifice 58. In this manner, the microlayer forming stem 46 may extend through the orifice 58 of each of the microlayer distribution plates 48. With such a configuration, the microlayer distribution plates 48 may have a generally annular shape such that the fluid outlet 52 forms a generally ring-like structure, which forces fluid flowing through the plate to exit the plate in a radially-convergent, ring-like flow pattern. Such ring-like structure of fluid outlet 52, in combination with its proximity to the microlayer forming stem 46, causes the fluid exiting the microlayer plates 48 to assume a cylindrical shape as the fluid is deposited onto the microlayer stem 46. Each flow of fluid from each of the microlayer distribution plates 48 thus deposits a distinct cylindrical microlayer on the microlayer forming stem 46.

The microlayer plates 48 may be arranged to provide a predetermined order in which the microlayers are deposited onto the microlayer forming stem 46. For example, if all fifteen microlayer distribution plates 48a-o are supplied with fluid, a microlayer of fluid from plate 48a will be the first to be deposited onto microlayer forming stem 46 such that such microlayer will be in direct contact with the stem 46. The next microlayer to be deposited onto the forming stem would be from microlayer plate 48b. This microlayer will be deposited onto the microlayer from plate 48a. Next, fluid from microlayer plate 48c will be deposited on top of the microlayer from plate 48b, etc. The last and, therefore, outermost microlayer to be deposited is from plate 48o. In this manner, the microlayers are deposited onto the microlayer forming stem 46 in the form of a substantially unified, microlayered fluid mass 60

(see FIG. 5). In the present example, such microlayered fluid mass 60 would comprise up to fifteen distinct microlayers (at the downstream end of stem 46), arranged as fifteen concentric cylindrical microlayers bonded and flowing together in a predetermined order (based on the ordering of the microlayer plates 48*a-o*) on microlayer forming stem 46.

It may thus be appreciated that the fluid layers from the microlayer distribution plates 48 are deposited onto the microlayer forming stem 46 either directly (the first layer to be deposited, e.g., from microlayer plate 48*a*) or indirectly (the second and subsequent layers, e.g., from microlayer plates 48*b-o*). The orifices 58 in each of the microlayer plates 48 are preferably large enough in diameter to space the fluid outlets 52 of the microlayer plates 48 sufficiently from the microlayer forming stem 46 to form an annular passage 62 for the microlayers (FIG. 2). The extent of such spacing is preferably sufficient to accommodate the volume of the concentric microlayers flowing along the microlayer stem 46.

In accordance with the present invention, microlayer forming stem 46 is in fluid communication with primary forming stem 30 such that the microlayered fluid mass 60 flows from the microlayer forming stem 46 and onto the primary forming stem 30. This may be seen in FIG. 5, wherein microlayered fluid mass 60 from microlayer assembly 34 is shown flowing from microlayer forming stem 46 and onto primary forming stem 30. Fluid communication between the microlayer stem 46 and primary stem 30 may be achieved by including in die 12 an annular transfer gap 64 between the annular passage 62 for the microlayer stem 46 and the annular passage 42 for the primary stem 30 (see also FIG. 2). Such transfer gap 64 allows the microlayered fluid mass 60 to flow out of the annular passage 62 and into the annular passage 42 for the primary forming stem 30. In this manner, the microlayers from microlayer plates 48 are introduced as a unified mass into the generally larger volumetric flow of the thicker fluid layers from the distribution plates 32.

The inventors have discovered that combining the flows of the microlayers with the thicker fluid layers in this fashion minimizes the deleterious effects of interfacial flow instabilities, which generally make it difficult to combine the flow of thin layers with relatively thick layers in such a way that the physical integrity and independent properties of the thin layers are maintained. The microlayer forming stem 46 allows the microlayers from the microlayer plates 48 to assemble into the microlayered fluid mass 60 in relative calm, i.e., without being subjected to the more powerful sheer forces of the thicker layers flowing from the distribution plates 32. As the microlayers assemble into the unified fluid mass 60 on stem 46, the interfacial flow instabilities created by the merger of each layer onto the fluid mass 60 are minimized because all the microlayers have a similar degree of thickness, i.e., relative to the larger degree of thickness of the fluid layers from distribution plates 32. When fully assembled, the microlayered fluid mass 60 enters the flow of the thicker layers from distribution plates 32 on primary stem 30 with a mass flow rate that more closely approximates that of such thicker layers, thereby increasing the ability of the microlayers in fluid mass 60 to retain their physical integrity and independent physical properties.

As shown in FIG. 2, primary forming stem 30 and microlayer forming stem 46 may be substantially coaxially aligned with one another in die 12, e.g., with the microlayer forming stem 46 being external to the primary forming stem 30. This construction provides a relatively compact configuration for die 12, which can be highly advantageous in view of the stringent space constraints that exist in the operating environment of many commercial coextrusion systems.

For example, the coaxial alignment of the primary forming stem 30 with the microlayer forming stem 46 allows the distribution plates 32 and the microlayer assembly 34 to be axially positioned along the primary forming stem, as shown in FIG. 2. This reduces the width of die 12, and also allows the fluids from both the distribution plates 32 and the microlayer assembly 34 to flow in an axial direction, e.g., in parallel paths along primary forming stem 30 and microlayer forming stem 46, then together along the primary stem 30 downstream of transfer gap 64, at which the microlayered fluid mass 60 flows from the microlayer stem 46 and onto the primary stem 30 to merge with the fluid layers from the distribution plates 32.

Such construction also allows die 12 to be set up in a variety of different configurations to produce a coextruded film having a desired combination of thick layers and microlayers. For example, one or more distribution plates 32 may be located upstream of the microlayer assembly 34. In this embodiment, fluid layers from such upstream distribution plates are deposited onto primary forming stem 30 prior to the deposition of the microlayered fluid mass 60 onto the primary stem 30. With reference to FIG. 2, it may be seen that distribution plates 32*a-c* are located upstream of microlayer assembly 34 in die 12. Fluid layers 65 from such upstream distribution plates 32*a-c* are thus interposed between the microlayered fluid mass 60 and the primary forming stem 30 (see FIG. 5).

Alternatively, the microlayer assembly 34 may be located upstream of the distribution plates 32, i.e., the distribution plates may be located downstream of the microlayer assembly 34 in this alternative embodiment. Thus, the microlayers from the microlayer assembly 34, i.e., the microlayered fluid mass 60, will be deposited onto primary forming stem 30 prior to the deposition thereon of the fluid layers from the downstream distribution plates 32. With reference to FIG. 2, it may be seen that microlayer assembly 34 is located upstream of distribution plates 32*d-e* in die 12. As shown in FIG. 5, the microlayered fluid mass 60 is thus interposed between the fluid layer(s) 70 from such distribution plates 32*d-e* and the primary forming stem 30.

As illustrated in FIG. 2, the microlayer assembly 34 may also be positioned between one or more upstream distribution plates, e.g., plates 32*a-c*, and one or more downstream distribution plates, e.g., plates 32*d-e*. In this embodiment, fluid(s) from upstream plates 32*a-c* are deposited first onto primary stem 30, followed by the microlayered fluid mass 60 from the microlayer assembly 34, and then further followed by fluid(s) from downstream plates 32*d-e*. In the resultant multilayered film, the microlayers from microlayer assembly 34 are sandwiched between thicker layers from both the upstream plates 32*a-c* and the downstream plates 32*d-e*.

As a further variation, die 12 may include one or more additional microlayer assemblies, which may be the same as microlayer assembly 34 or may have a different configuration, e.g., a different number of microlayer plates. In this embodiment, any such additional microlayer assemblies may be coaxially aligned with the primary forming stem 30, and may be positioned upstream and/or downstream of the microlayer assembly 34 shown in FIG. 2. Such additional microlayer assemblies may be used in place of or in addition to the distribution plates 32. Thus, additional microlayer assemblies may be positioned adjacent to the microlayer assembly 34, or may be spaced from such assembly 34 by one or more distribution plates 32. If two or more microlayer assemblies are included in die 12, such assemblies may also be sandwiched between upstream and downstream distribution plates, e.g., between the upstream plates 32*a-c* and downstream plates 32*d-e* shown in FIG. 2.

In many embodiments of the invention, most or all of the microlayer plates 48 have a thickness that is less than that of the distribution plates 32. Thus, for example, the distribution plates 32 may have a thickness $T_1$ (see FIG. 5) ranging from about 0.5 to about 2 inches, e.g., greater than 0.5 inch, such as 0.501 or more, 0.502 or more, 0.503 or more, etc., or less than 2, e.g., 1.999 or less, 1.998 or less, etc., such as from about 0.501 to 1.999 inches, 0.502 to 1.998 inches, etc. The microlayer distribution plates 48 may have a thickness $T_2$ ranging from about 0.1 to about 0.5 inch, e.g., greater than 0.1, such as 0.101 or more, 0.102 or more, etc., or less than 0.5, e.g., 0.499 or less, 0.498 or less, etc., such as from about 0.101 to 0.499 inch, 0.102 to 0.498 inch, etc. Such thickness ranges are not intended to be limiting in any way, but only to illustrate typical examples. All distribution plates 32 will not necessarily have the same thickness, nor will all of the microlayer plates 48. For example, microlayer plate 48o, the most downstream of the microlayer plates in the assembly 34, may be thicker than the other microlayer plates to accommodate a sloped contact surface 66, which may be employed to facilitate the transfer of microlayered fluid mass 60 through the annular gap 64 and onto the primary forming stem 30.

As also shown in FIG. 5, each of the microlayers flowing out of the plates 48 has a thickness "M" corresponding to the thickness of the fluid outlet 52 from which each microlayer emerges. The microlayers flowing from the microlayer plates 48 are schematically represented in FIG. 5 by the phantom arrows 68.

Similarly, each of the relatively thick fluid layers flowing out of the plates 32 has a thickness "D" corresponding to the thickness of the fluid outlet 38 from which each such layer emerges (see FIG. 5). The relatively thick fluid layers flowing from the distribution plates 32 are schematically represented in FIG. 5 by the phantom arrows 70.

Generally, the thickness M of the microlayers will be less than the thickness D of the fluid layers from the distribution plates 32. The thinner that such microlayers are relative to the fluid layers from the distribution plates 32, the more of such microlayers that can be included in a multilayer film, for a given overall film thickness. Microlayer thickness M from each microlayer plate 48 will generally range from about 1-20 mils (1 mil=0.001 inch), e.g., greater than 1 mil, greater than 2 mils, greater than 3 mils, etc., less than 20 mils, less than 19 mils, less than 18 mils, etc., such as between 2 to 19 mils, 3 to 18 mils, 4 to 17 mils, etc. Thickness D from each distribution plate 32 will generally range from about 20-100 mils, e.g., greater than 20 mils, greater than 21 mils, greater than 22 mils, etc., less than 100 mils, less than 90 mils, less than 80 mils, less than 70 mils, less than 60 mils, etc., such as between 20 to 50 mils, 21 to 49 mils, 22 to 48 mils, 23 to 47 mils, etc. The foregoing thicknesses are not intended to be limiting of the scope of the present invention in any way, and are provided solely for illustration purposes.

The ratio of M:D may range from about 1:1 to about 1:8, e.g., greater than 1:1, greater than 1:1.1, greater than 1:1.2, greater than 1:2, greater than 1:3, etc., less than 1:8, less than 1:7.9, less than 1:7.8, less than 1:7, less than 1:6, etc., such as between 1:1.1-1:7.9; 1:1.2-1:7.8, 1:2-1:7, 1:3-1:6, 1:4-1:5, etc.

Thickness M may be the same or different among the microlayers 68 flowing from microlayer plates 48 to achieve a desired distribution of layer thicknesses in the microlayer section of the resultant film. Similarly, thickness D may be the same or different among the thicker layers 70 flowing from the distribution plates 32 to achieve a desired distribution of layer thicknesses in the 'thick-layer section(s)' of the resultant film. The layer thicknesses M and D will typically change as the fluid flows downstream through the die, e.g., if the melt tube is expanded at annular discharge opening 44 as shown in FIG. 2, and/or upon further downstream processing of the tubular film, e.g., by stretching, orienting, or otherwise expanding the tube to achieve a final desired film thickness and/or to impart desired properties into the film. Such downstream processing techniques are well known in the art. The flow rate of fluids through the plates will also have an effect on the final downstream thicknesses of the corresponding film layers.

With reference back to FIGS. 1-2, it may be appreciated that a method of coextruding a plurality of fluid layers in accordance with the present invention comprises the steps of:

a. directing one or more fluids through one or more distribution plates 32 and onto primary forming stem 30 in die 12;

b. forming a substantially unified, microlayered fluid mass 60 on microlayer forming stem 46 by directing at least one additional fluid through microlayer assembly 34; and c. directing the microlayered fluid mass 60 from the microlayer forming stem 46 and onto the primary forming stem 30 to merge the microlayered fluid mass 60 with the fluid layer(s) from the distribution plate(s) 32.

As described above, the distribution plates 32 and microlayer plates 48 preferably have an annular configuration, such that primary forming stem 30 and microlayer stem 46 pass through the center of the plates to receive fluid that is directed into the plates. The fluid may be supplied from extruders, such as extruders 14a, b. The fluid may be directed into the die 12 via vertical supply passages 72, which receive fluid from feed pipes 18, and direct such fluid into the die plates 32 and 48. For this purpose, the plates may have one or more through-holes 74, e.g., near the periphery of the plate as shown in FIG. 3, which may be aligned to provide the vertical passages 72 through which fluid may be directed to one or more downstream plates.

Although three through-holes 74 are shown in FIG. 3, a greater or lesser number may be employed as necessary, e.g., depending upon the number of extruders that are employed. In general, one supply passage 72 may be used for each extruder 14 that supplies fluid to die 12. The extruders 14 may be arrayed around the circumference of the die, e.g., like the spokes of a wheel feeding into a hub, wherein the die is located at the hub position.

With reference to FIG. 1, die 12 may include a primary manifold 76 to receive the flow of fluid from the extruders 14 via feed pipes 18, and then direct such fluid into a designated vertical supply passage 72, in order to deliver the fluid to the intended distribution plate(s) 32 and/or microlayer plate(s) 48. The microlayer assembly 34 may optionally include a microlayer manifold 78 to receive fluid directly from one or more additional extruders 80 via feed pipe 82 (shown in phantom in FIG. 1).

In the example illustrated in FIGS. 1-2, extruder 14b delivers a fluid, e.g., a first molten polymer, directly to the fluid inlet 36 of distribution plate 32a via pipe 18b and primary manifold 76. In the presently illustrated embodiment, distribution plate 32a receives all of the output from extruder 14b, i.e., such that the remaining plates and microlayer plates in the die 12 are supplied, if at all, from other extruders. Alternatively, the fluid inlet 36 of distribution plate 32a may be configured to contain an outlet port to allow a portion of the supplied fluid to pass through to one or more additional plates, e.g., distribution plates 32 and/or microlayer plates 48, positioned downstream of distribution plate 32a.

For example, as shown in FIGS. 3-4 with respect to the illustrated microlayer plate 48, an outlet port 84 may be formed in the base of the fluid inlet 50 of the plate. Such outlet port 84 allows the flow of fluid delivered to plate 48 to be split: some of the fluid flows into channel 54 while the remainder passes through the plate for delivery to one or more additional downstream plates 48 and/or 32. A similar outlet port can be included in the base of the fluid inlet 36 of a distribution plate 32. Delivery of fluid passing through the outlet port 84 (or through a similar outlet port in a distribution plate 32) may be effected via a through-hole 74 in an adjacent plate (see FIG. 5), or via other means, e.g., a lateral-flow supply plate, to direct the fluid in an axial, radial, and/or tangential direction through die 12 as necessary to reach its intended destination.

Distribution plates 32b-c are being supplied with fluid via extruder(s) and supply pipe(s) and/or through-holes that are not shown in FIG. 2. The fluid flow along primary forming stem 30 from distribution plates 32a-c is shown in FIG. 5, as indicated by reference numeral 65.

As shown in FIGS. 1-2, microlayer assembly 34 is being supplied with fluid by extruders 14a and 80. Specifically, microlayer plates 48a, c, e, g, i, k, m, and o are supplied by extruder 14a via supply pipe 18a and vertical pipe and/or passage 72. Microlayer plates 48b, d, f, h, j, l, and n are supplied with fluid by extruder 80 via feed pipe 82 and a vertical supply passage 86. In the illustrated embodiment, vertical passage 86 originates in microlayer manifold 78 and delivers fluid only within the microlayer assembly 34. In contrast, vertical passage 72 originates in manifold 76, extends through distribution plates 32a-c (via aligned through-holes 74 in such plates), then further extends through manifold 78 via manifold passage 79 before finally arriving at microlayer plate 48a.

Fluid from extruder 14a and vertical passage 72 enters microlayer plate 48a at fluid inlet 50. Some of the fluid passes from inlet 50 and into channel 54 (for eventual deposition on microlayer stem 46 as the first microlayer to be deposited on stem 46), while the remainder of the fluid may pass through plate 48a via outlet port 84. Microlayer plate 48b may be oriented, i.e., rotated, such that a through-hole 74 is positioned beneath the outlet port 84 of microlayer plate 48a so that the fluid flowing out of the outlet port 84 flows through the microlayer plate 48b, and not into the channel 54 thereof. Microlayer plate 48c may be positioned such that the fluid inlet 50 thereof is in the same location as that of microlayer plate 48a so that fluid flowing out of through-hole 74 of microlayer plate 48b flows into the inlet 50 of plate 48c. Some of this fluid flows into the channel 54 of plate 48c while some of the fluid passes through the plate via outlet port 84, passes through a through-hole 74 in the next plate 48d, and is received by fluid inlet 50 of the next microlayer plate 48e, where some of the fluid flows into channel 54 and some passes out of the plate via outlet port 84. Fluid from extruder 14a continues to be distributed to remaining plates 48g, i, k, and m in this manner, except for microlayer plate 48o, which has no outlet port 84 so that fluid does not pass through plate 48o, except via channel 54 and fluid outlet 52.

In a similar manner, fluid from extruder 80 and vertical passage 86 passes through microlayer plate 48a via a through-hole 74 and then enters microlayer plate 48b at fluid inlet 50 thereof. Some of this fluid flows through the channel 54 and exits the plate at outlet 52, to become the second microlayer to be deposited onto microlayer stem 46 (on top of the microlayer from plate 48a), while the remainder of the fluid passes through the plate via an outlet port 84. Such fluid may pass through microlayer plate 48c via a through-hole 74, and be delivered to plate 48d via appropriate alignment of its inlet 50 with the through-hole 74 of plate 48c, through which the fluid from extruder 80 passes. This fluid-distribution process may continue for plates 48f, h, j, and l, until the fluid reaches plate 48n, which has no outlet port 84 such that fluid does not pass through this plate except via its fluid outlet 52.

In this manner, a series of microlayers comprising alternating fluids from extruders 14a and 80 may be formed on microlayer stem 46. For example, if extruder 14a supplied EVOH and extruder 80 supplied PA6, the resultant microlayered fluid mass 60 would have the structure:

EVOH/PA6/EVOH/PA6/EVOH/PA6/EVOH/PA6/EVOH/ PA6/EVOH/PA6/EVOH/PA6/EVOH

The fluids from extruders 14a and 80 may be the same or different such that the resultant microlayers in microlayered fluid mass 60 may have the same or a different composition. Only one extruder may be employed to supply fluid to the entire microlayer assembly 34, in which case all of the resultant microlayers will have the same composition. Alternatively, three or more extruders may be used to supply fluid to the microlayer assembly 34, e.g., with each supplying a different fluid such that three different microlayer compositions are formed in microlayered fluid mass 60, in any desired order, e.g., abcabc; abbcabbc; abacabac; etc.

Similarly, the fluid(s) directed through the distribution plate(s) 32 may be substantially the same as the fluid(s) directed through the microlayer assembly 34. Alternatively, the fluid(s) directed through the distribution plate(s) 32 may be different from the fluid(s) directed through the microlayer assembly. The resultant tubular film may have thick layers and microlayers that have substantially the same composition. Alternatively, some of the thick layers from distribution plates 32 may be the same as some or all of the microlayers from microlayer plates 48, while other thick layers may be different from some or all of the microlayers.

In the illustrated example, the extruders and supply passages for distribution plates 32d-e are not shown. One or both of such plates may be supplied from extruder 14a, 14b, and/or 80 by appropriate arrangement of vertical supply passages 72, 86, through-holes 74, and/or outlet ports 84 of the upstream distribution plates 32 and/or microlayer plates 48. Alternatively, one or both distribution plates 32d-e may not be supplied at all, or may be supplied from a separate extruder, such as an extruder in fluid communication with primary manifold 76 and a vertical supply passage 72 that extends through distribution plates 32a-c and microlayer assembly 34, e.g., via appropriate alignment of the through-holes 74 of plates 32a-c and microlayer assembly 34 to create a fluid transport passage through die 12, leading to fluid inlet 50 of distribution plate 32d and/or 32e.

If desired, one or more of the distribution plates 32 and/or microlayer plates 48 may be supplied with fluid directly from one or more extruders, i.e., by directing fluid directly into the fluid inlet of the plate, e.g., from the side of the plate, without the fluid being first routed through one of manifolds 76 or 78 and/or without using a vertical supply passage 72, 86. Such direct feed of one or more plates 32 and/or 48 may be employed as an alternative or in addition to the use of manifolds and vertical supply passages as shown in FIG. 2.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention.

What is claimed is:

1. A die for coextruding a plurality of fluid layers, comprising:
   a. a primary forming stem;
   b. one or more distribution plates, each of said plates having a fluid inlet and a fluid outlet, the fluid outlet from each of said plates being in fluid communication with said primary forming stem and structured to deposit a layer of fluid onto said primary forming stem having a thickness D; and c. a microlayer assembly, comprising
   (1) a microlayer forming stem, and
   (2) a plurality of microlayer distribution plates, each of said microlayer plates having a fluid inlet and a fluid outlet, the fluid outlet from each of said microlayer plates being in fluid communication with said microlayer forming stem and structured to deposit a microlayer of fluid onto said microlayer forming stem having a thickness M, said microlayer plates being arranged to provide a predetermined order in which the microlayers are deposited onto said microlayer forming stem to form a substantially unified, microlayered fluid mass on said microlayer forming stem,
   wherein, said thickness M of said microlayers is less than said thickness D of said fluid layer from said distribution plate, and
   said microlayer forming stem is in fluid communication with said primary forming stem such that said microlayered fluid mass flows from said microlayer forming stem and onto said primary forming stem in order to minimize interfacial flow instabilities.

2. The die of claim 1, wherein said distribution plate has a thickness ranging from about 0.5 to about 2 inches and said microlayer distribution plates have a thickness ranging from about 0.1 to about 0.5 inch.

3. The die of claim 1, wherein said microlayer distribution plates have one or more flow channels connecting said fluid inlet with said fluid outlet, said flow channels having a spiral-shaped configuration.

4. The die of claim 1, wherein
said microlayer distribution plates each have an orifice extending through said plate;
said fluid outlet of each of said microlayer distribution plates is positioned adjacent to said orifice; and
said microlayer forming stem extends through the orifice of each of said microlayer distribution plates.

5. The die of claim 1, wherein said primary forming stem and said microlayer forming stem are substantially coaxially aligned with one another.

6. The die of claim 5, wherein said microlayer forming stem is external to said primary forming stem.

7. The die of claim 1, wherein
said distribution plates and said microlayer assembly are axially positioned along said primary forming stem; and
the fluids from said distribution plates and said microlayer assembly flow in an axial direction along said primary forming stem.

8. The die of claim 7, wherein said distribution plates are located upstream of said microlayer assembly.

9. The die of claim 7, wherein said microlayer assembly is located upstream of said distribution plates.

10. The die of claim 7, wherein said microlayer assembly is positioned between one or more upstream distribution plates and one or more downstream distribution plates.

11. The die of claim 1, wherein said microlayer assembly comprises at least about 5 microlayer plates.

12. The die of claim 11, wherein said microlayer assembly comprises at least about 10 microlayer plates.

13. The die of claim 1, further including one or more additional microlayer assemblies.

14. The die of claim 1, wherein the ratio of M:D ranges from about 1:1 to about 1:8.

15. The die of claim 1, wherein
said microlayer thickness M ranges from about 1-20 mils; and
said layer thickness D from said distribution plate ranges from about 20-100 mils.

16. The die of claim 1, wherein
each of said microlayers that are deposited onto said microlayer forming stem have physical integrity and independent physical properties; and
said microlayered fluid mass merges with said fluid layer from said distribution plate on said primary forming stem with a mass flow rate that more closely approximates that of said distribution plate layer, thereby increasing an ability of said microlayers in said fluid mass to retain said physical integrity and independent physical properties.

17. The die of claim 1, wherein said microlayer forming stem is separate from said primary forming stem.

18. The die of claim 1, wherein said thickness M of said microlayers is substantially the same.

19. The die of claim 1, wherein said thickness M of said microlayers is different among at least two of said microlayers.

* * * * *